United States Patent [19]

Kassai

[11] Patent Number: 4,602,395
[45] Date of Patent: Jul. 29, 1986

[54] BABY CARRIAGE BED

[75] Inventor: Kenzou Kassai, Osaka, Japan

[73] Assignee: Aprica Kassai Kabushikikaisha, Osaka, Japan

[21] Appl. No.: 605,880

[22] Filed: May 1, 1984

[30] Foreign Application Priority Data

May 16, 1983 [JP] Japan ............................ 58-86033

[51] Int. Cl.⁴ .................. B62B 7/06; B62B 7/12; B62B 9/12; A47D 13/02
[52] U.S. Cl. .............................. 5/93 R; 5/99 A; 5/101; 5/102; 280/47.4; 280/643; 280/648; 297/118
[58] Field of Search .................. 5/99, 101–107, 5/93, 97, 98, 94; 280/47.4, 643, 648, 47.39; 297/118, 433

[56] References Cited

U.S. PATENT DOCUMENTS

| 676,741 | 6/1901 | Flannery | 280/642 |
| 2,805,076 | 9/1957 | Thomas | 280/643 |
| 3,967,833 | 7/1976 | Fleischer | 280/47.37 R |
| 4,181,356 | 1/1980 | Fleischer | 5/99 R |
| 4,391,453 | 7/1983 | Glasser | 280/47.4 |

FOREIGN PATENT DOCUMENTS 472841 10/1937 United Kingdom ............... 5/98 C

Primary Examiner—Alexander Grosz
Attorney, Agent, or Firm—W. G. Fasse; D. H. Kane, Jr.

[57] ABSTRACT

A baby carriage bed has a bottom wall (2), a front wall (3), a back wall (4), a left-hand side wall (5), and a right-hand side wall (6) forming a box. The front portions (2a, 5a, 6a) of the bottom wall (2) and of the left-hand side and right-hand side walls (5, 6) are interconnected but separate from the respective rear portions (2b, 5b, 6b) so that the front portions (2a, 5a, 6a) are disposed in a staggered relationship relative to the rear portions (2b, 5b, 6b). The front wall (3) is separable from the left-hand and right-hand side walls (5, 6) and turnable around a hinge line (11) connecting the front wall to the bottom wall (2). A longitudinally slidable draw rod (12) is installed on each side below the bottom wall (2). The front portions (2a, 5a, 6a) are attached to the draw rods (12) so that when the latter are pushed rearwardly, the front portions slide into an overlap relationship relative to their rear portions (2b, 5b, 6b). Further, the front wall (3) and the baby carriage main body are interconnected by collapsible front and rear link rods (20, 22) for converting the bed into a chair and vice versa simply by operating the draw rods.

1 Claim, 12 Drawing Figures

BABY CARRIAGE BED

BACKGROUND OF THE INVENTION

1. Field of the Invention

This invention relates to a bed for baby carriages and particularly to a collapsible bed for baby carriages. The collapsible bed is capable of taking the form of a chair if desired.

2. Description of the Prior Art

Originally or at least when the baby carriage was first proposed, it was of the so-called "box type" in which a baby is comfortably held in the baby carriage. For babies, therefore, the box type is preferable from the standpoint of their growth and the box type is superior to other types as far as liveableness, or comfortableness are concerned. However, the change of times has gradually taken the edge off such baby-centered construction concept and placed more importance on the convenience of baby carriages as a means for conveying babies. For example, the chair type has predominated in baby carriages and, further, because of the use as a means of transportation, collapsible small-sized baby carriages are most popular. This is an inevitable consequence of various changes in life style and is one of the needs of the times.

The pursuit of the convenience of baby carriages as a means for conveying babies, as described above, cannot be disregarded as an important point in developing a new baby carriage. However, it seems necessary to go back to the starting point to think over what construction a baby carriage should have which does not hamper a baby's growth and reduce the liveableness and convenience of use of a baby carriage.

SUMMARY OF THE INVENTION

An object of this invention is to provide a bed for baby carriages which does not hamper a baby's growth or reduce the baby carriage liveableness, as described above. According to this invention, the bed is adapted to change its shape into a chair form.

This invention is a baby carriage bed of the so-called "box type", comprising a bottom wall, a front wall, a back wall, a left-hand side wall, and a right-hand side wall. In such box-form bed, when the walls located in the front are displaced to other locations and particularly when the front wall is downwardly displaced to open the front of the bed, the latter assumes a chair form. As an arrangement therefor, the respective front portions of the bottom wall and left-hand and right-hand side walls are fabricated separately from their rear portions and are disposed in staggered relation to the rear portions. Further, the front wall is separable from the left-hand and right-hand side walls and turnable around the boundary line between it and the bottom wall. Further, a pair of longitudinally slidable draw rods is installed on both sides below the bottom wall, and said front portions are attached to the draw rods. Thus, when the draw rods are pushed rearwardly into a retracted position, the front portions slide inwardly into an overlap relationship with the rear portions. Further, the front wall and the baby carriage main body are connected together by collapsible rod means for ensuring that the draw rods are in their forwardly drawn-out position when the front wall closes the front of the baby carriage bed, and that as the draw rods are pushed rearwardly, the front wall is displaced downwardly to open the front of the baby carriage bed, thus enabling the bed to serve as a chair.

According to this invention, there is obtained a box type baby carriage bed, which is desirable from the standpoint of a baby's growth and the comfortableness of the carriage. The change of such basic bed form to the chair form does not require the addition of separately prepared members or the removal of members originally provided as part of the bed and can be made by simply deforming or displacing some of the originally provided members relative to other members of the bed. That is, when the pair of draw rods is drawn out forwardly, the members forming the front portion of the bed more forwardly until the front wall closes the front of the baby carriage bed, but when the draw rods are pushed rearwardly, the members forming the front of the bed are also rearwardly moved, with the front wall opening the front of the bed to enable the latter to serve as a chair. Therefore, there is no possibility whatsoever of losing parts as there would be where separable members are provided for changing the bed form to the chair form. Further, since the collapsible rod means render the front wall displaceable in response to the sliding movement of the draw rods, the operation for changing between the bed form and the chair form of this baby carriage bed is very simple.

These objects and other objects, features, aspects and advantages of the present invention will become more apparent from the following detailed description of the present invention when taken in conjunction with the accompanying drawings.

DESCRIPTION OF PREFERRED EMBODIMENTS AND OF THE BEST MODE OF THE INVENTION

Figure 1:
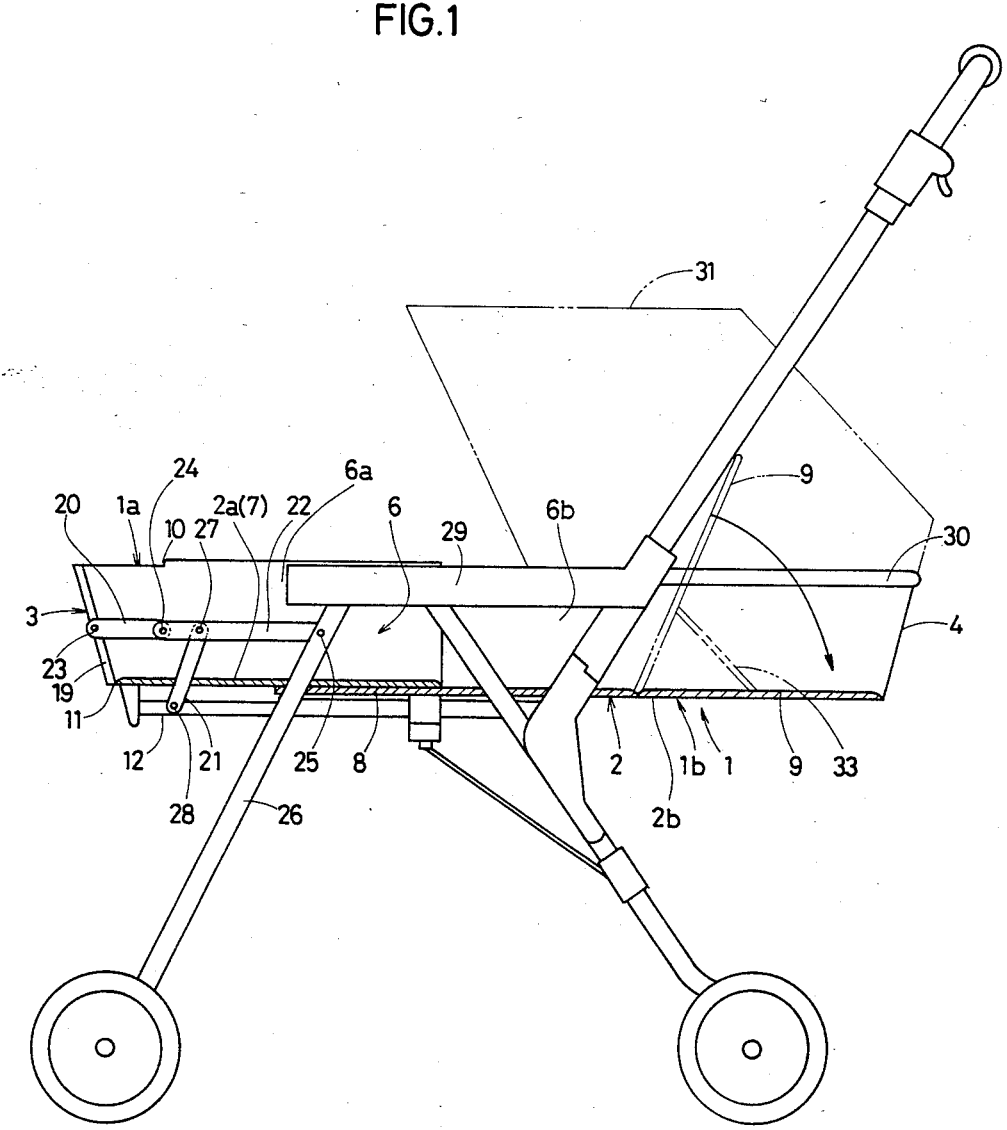
FIG. 1 is a side view of a baby carriage having an embodiment of this invention attached thereto, with the bed shown in its original bed form.

The baby carriage bed 1 is in the form of a box comprising a bottom wall 2, a front wall 3, a back wall 4, a left-hand side wall 5, and a right-hand side wall 6. These walls 2 to 6 are made of a suitable fabric or the like and in some portions the flexibility of the fabric or the like is utilized and in other portions a hard core is incorporated to impart suitable strength.

Figure 4:
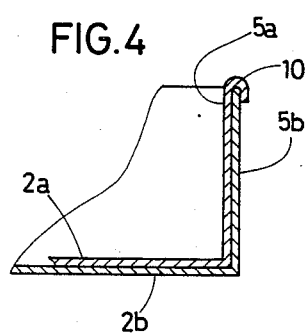
FIG. 4 is a sectional view taken along the line IV—IV in FIG. 2.

In FIG. 1, the bed 1 is shown with the left-hand side wall 5 removed. The bottom wall 2 of the bed 1 has a hard core incorporated therein. The hard core incorporated in the bottom wall 2 has three parts, one part 7 forms a front core for the front portion 2a, a second part 8 is an intermediate core between the front and rear portion 2a and 2b. A third part 9 forms a core for its rear portion 2b. Thus, the rear portion 2b of the bottom wall 2 is divided into two regions with the intermediate 8 and the third core 9. Further, the front portions 5a and 6a of the left-hand and right-hand side walls 5 and 6 are formed as separate members each having a hard core incorporated therein. The respective front portions 2a, 5a, and 6a of the bottom wall 2 and left-hand and right-hand side walls 5 and 6 are integrally fabricated and cooperate with the front wall 3 to form the front portion 1a of the bed 1. The rear portion of the bed 1 comprises rear sections 2b, 5b and 6b of the bottom wall 2 and left-hand and right-hand side walls 5 and 6, and the back wall 4. The front portion 1a of the bed 1 is staggered relative to the rear portion 1b, i.e., it overlaps the rear portion 1b. Engaging rails 10 are disposed along the upper edges of the front portions 5a and 6a of the left-hand and right-hand side walls 5 and 7 and engage the upper edge of the rear portions 5b and 6b of the left-hand and right-hand side walls 5 and 6, as best seen in FIG. 4.

The front wall 3 is separable from the front portions 5a and 6a of the left-hand and right-hand side walls 5 and 6 and turnable around the boundary line 11 between it and the front portion 2a of the bottom wall 2.

Draw rods 12 are installed on both sides below the bottom wall 2 so that they are longitudinally slidable. In FIG. 1, the draw rods 12 are shown forwardly drawn out.

Figure 5:
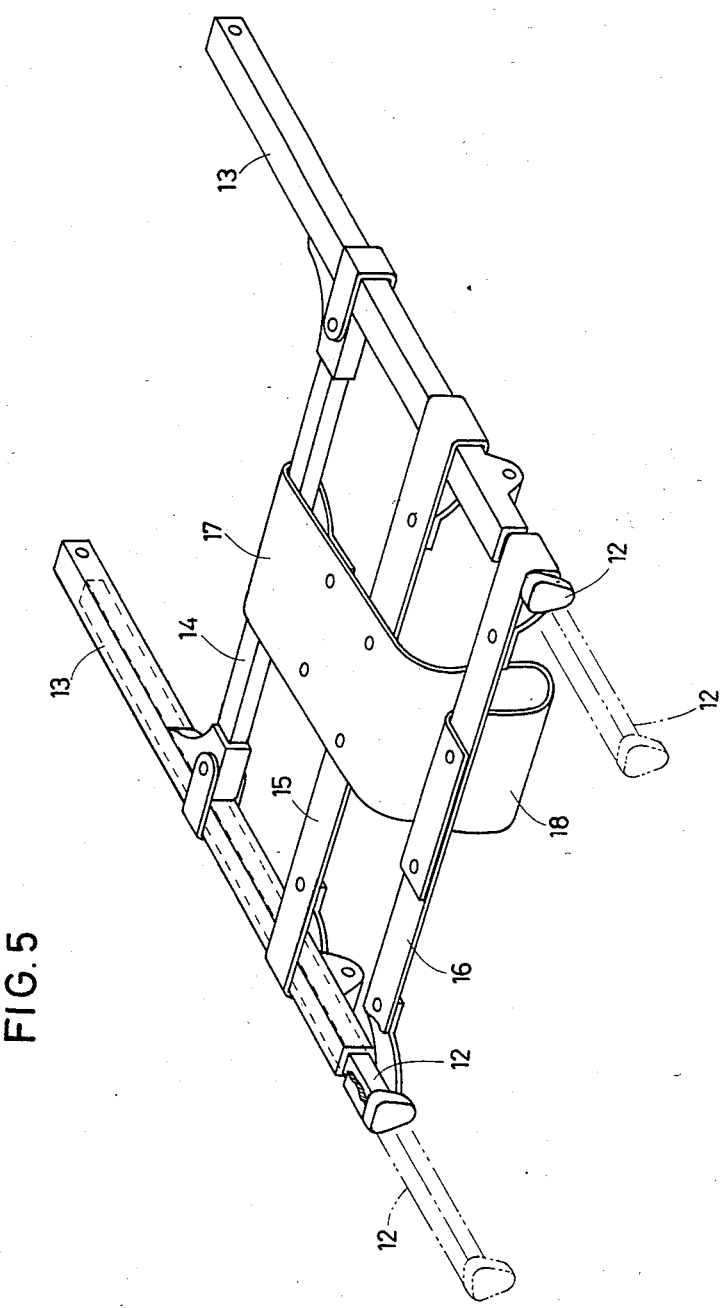
FIG. 5 is a perspective view showing the draw rods and parts associated with its draw rods; therewith.

Referring to FIG. 5, the draw rods 12 are inserted in a pair of longitudinally extending tube members 13 installed in the baby carriage main body, whereby the rods 12 are slidably held. A widthwise connecting rod 14 and a first widthwise connecting belt 15 are connected between the draw rods 12. Further, a second widthwise connecting belt 16 is connected between the front ends of the draw rods 12. Intermediate between the tube members 13 and in parallel relation thereto, a wide belt 17 is installed to connect the widthwise connecting rod 14 and first and second connecting belts 15 and 16. The widthwise connecting rod 14, the widthwise connecting belts 15, 16 and the wide belt 17 are in contact with the lower surface of the bottom wall 2 to supplementarily support the bottom wall 2. The state shown in solid lines in FIG. 5 is the state in which the draw rods 12 have been pushed back into tube members 13, whereby a sag 18 is produced in the wide belt 17. When the draw rods 12 pull out forwardly as shown in phantom lines in FIG. 5, the sag 18 disappears to limit the extent of the forward draw-out of the draw rods 12.

The front portion 1a of the bed 1 is attached to the draw rods 12, and when the draw rods 12 are pushed in rearwardly, the front portion 1a slides back while overlapping the rear portion 1b of the bed 1.

As best seen in FIG. 1, the front wall 3 and the baby carriage main body are interconnected by collapsible rods, for example. Frames 19, forming a pair, are attached to opposite sides of the front wall 3. The aforesaid collapsible rods comprise a front link rod 20, a central lnk rod 21, and a rear link rod 22. The front link rod 20 is turnably connected at its front end to the front wall 3 by a pivot pin 23 and at its rear end to the front end of the rear link rod 22 by a pivot pin 24. The rear link rod 22 is turnably connected at its rear end to the associated front leg 26 of the baby carriage 1 by a pivot pin 25. The central link rod 21 is turnably connected at its upper end to the central portion of the rear link rod 22 by a pivot pin 27 and at its lower end to the associated draw rod 12 by a pivot pin 28. The link rods 20, 21, and 22 are constructed as relatively hard members, and their dimensional and positional relations are so selected as to attain an operation to be described below with reference to FIGS. 6 to 10.

In addition, if the frames 19 attached to opposite sides of the front wall 3 are made of hard materials and are long enough to extend substantially throughout the length of the opposite sides, then the front wall 3 is held by the pair of frames 19, so that there is no need to incorporate a hard core in the front wall 3. Further, since the rear portions 5b and 6b of the left-hand and right-hand side walls 5 and 6 and the back wall 4 are held by a handrail 29 on the baby carriage main body and a frame 30 extending rearwardly of the handrail 29, there is no particular need to incorporate a hard core therein either.

Although it is stated that there is no particular need for a hard core for the front wall 3, preferably an elongated core extending along the upper end edge of the front wall 3 may be incorporated. As shown in phantom lines in FIG. 1, a hood 31 may be installed to cover a rear portion of the bed.

In FIG. 1, the draw rods 12 have been drawn out to their foremost position and the front portion 1a of the bed 1 has been correspondingly moved to its foremost position. Further, the front wall 3 has been pushed rearwardly by the front and rear link rods 20 and 22, so that its turning around the boundary line 11 between it and the bottom wall 2 is inhibited. In this state, preferably the arrangement is such that the front wall 3 is in intimate contact with the front end edges of the front portions 5a and 6a of the left-hand and right-hand side walls for preventing entry of an air draft into the bed 1. In this embodiment, to ensure a more reliable prevention of an air draft, the opposite lateral sides of the front wall 3 may be provided with hems 32 which will extend along the outer surfaces adjacent the front end edges of the front portions 5a and 6a of the left-hand and right-hand side walls when the front wall 3 closes the front of the baby carriage as shown in FIG. 1 or 2.

Figure 2:
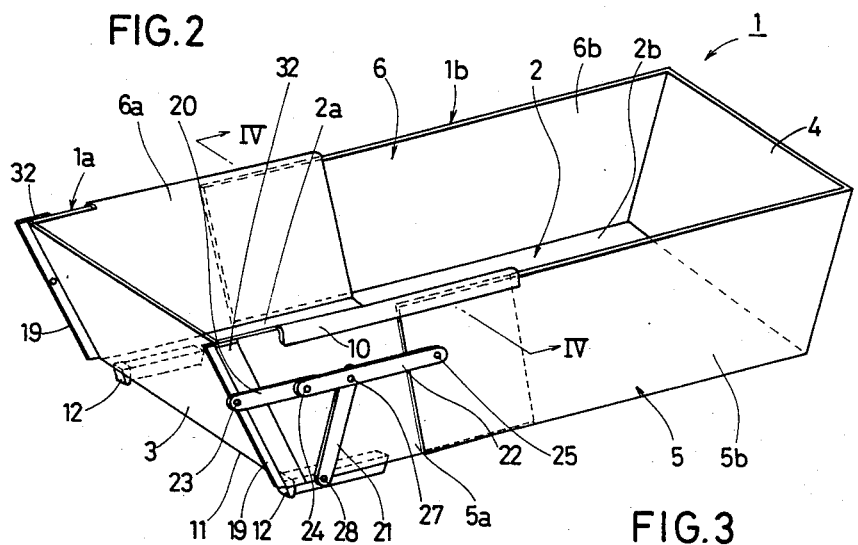
FIG. 2 is a perspective view showing the bed of FIG. 1.
Figure 3:
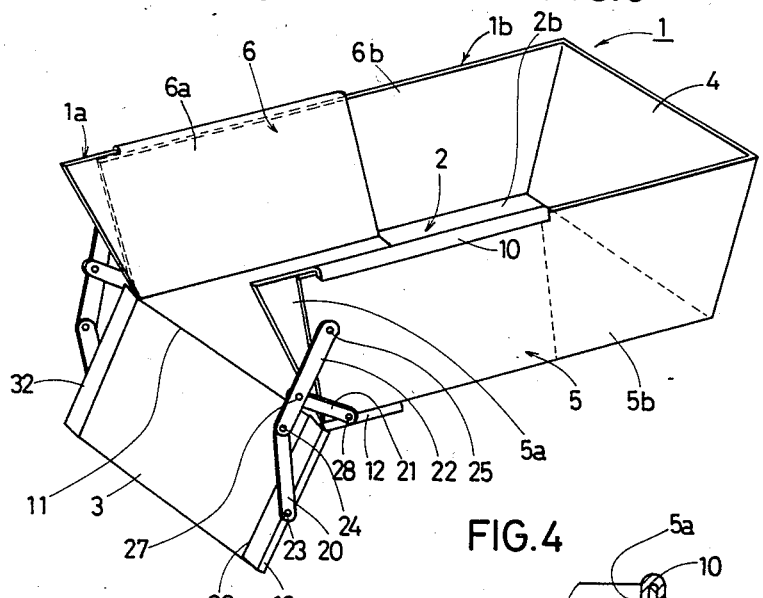
FIG. 3 is a view showing the bed of FIG. 2 in its chair form.

The shape of the bed 1 from the bed form shown in FIG. 1 or 2, to the chair form shown in FIG. 3, is changed by rearwardly pushing the pair or draw rods 12. The successive forms taken during the change from bed form to chair form are diagrammatically shown in FIGS. 6 to 10.

Figure 6:
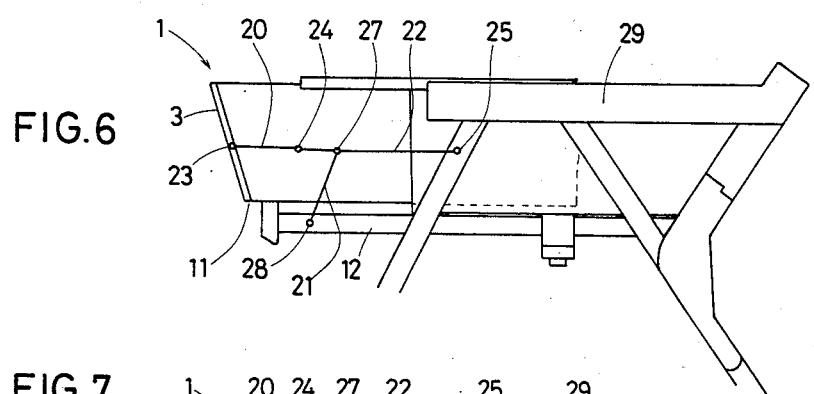
FIGS. 6 to 10 are side views diagrammatically showing successive steps taken for changing the bed form to the chair form.
Figure 7:
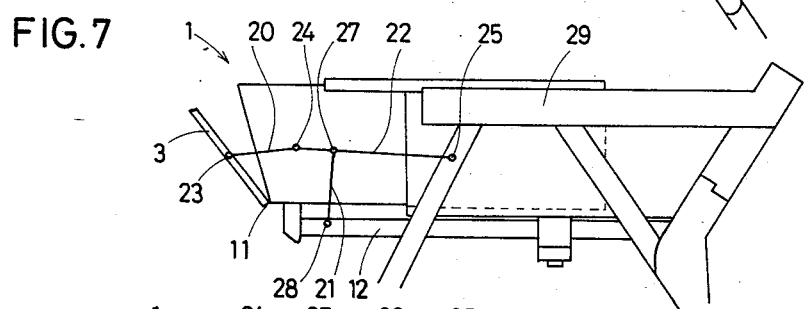
Figure 8:
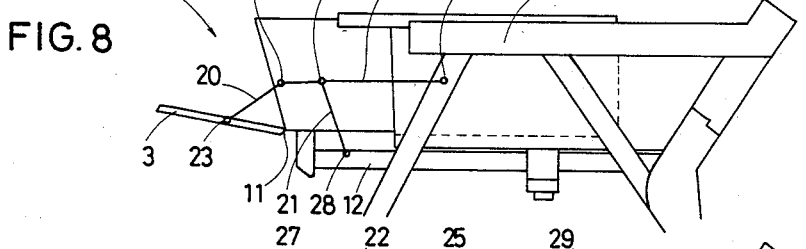
Figure 9:
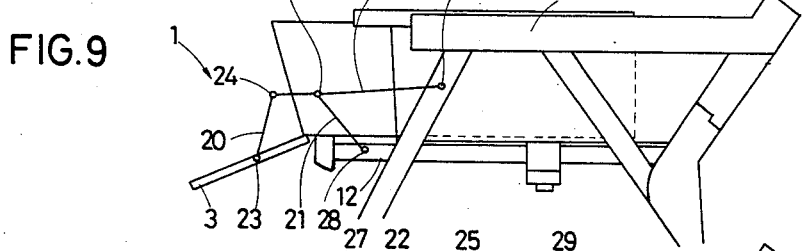

The state shown in FIG. 6 is the state in which the draw rods 12 are drawn out to the foremost position, and in this state, the downward turning of the front wall 3 is inhibited by the front and rear link rods 20 and 22. As will be understood by successive reference to FIGS. 7 to 10, as the draw rods 12 are pushed rearwardly, the collapse angle between the front and rear link rods 20 and 22 increases and the front wall 3 turns downwardly around the boundary line 11 between it and the front portion 2a of the bottom wall 2, until the front of the bed 1 is brought into the open state shown in FIG. 10. In addition, the central link rod 21 is assisting the front and rear link rods 20 and 22 in collapsing or turning around the pivot pin 24. Therefore, the central link rod is not absolutely necessary in turning the front wall 3 with the sliding movement of the draw rods 12.

Figure 10:
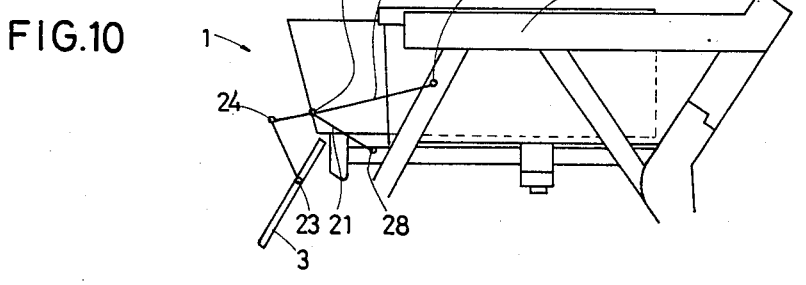

When the front of the bed 1 is opened as shown in FIG. 10, the bed can be used as a chair. That is, the baby is allowed to project his or her legs to the front of the bed 1. At this time, the front wall 3 extends along the back parts of the legs and serves to protect the legs.

In addition, when the bed 1 is changed into the chair form, the rear half part or core 9 of the rear portion 2b of the bottom wall 2 may be utilized to form the backrest, for example, as shown in phantom lines in FIG. 1. For this purpose the rear backward half core 9 may be arranged to rise from the bottom wall 2 and be supported in its raised state by suitable support member 33 to form the backrest.

To restore the bed 1 to its original bed form, it is only necessary to forwardly draw out the draw rods 12 and in this case if the dimensional and positional relations of the front, rear and central link rods 20, 22, and 21 are suitably selected, the front wall 3 will automatically change from the open state shown in FIG. 10 to the closed state shown in FIG. 6. However, if the dimensional and positional relations of the front, rear and central link rods 20, 22, and 21 are not so selected, the front wall 3 will have to be turned by hand while drawing out the draw rods 12.

Figure 11:
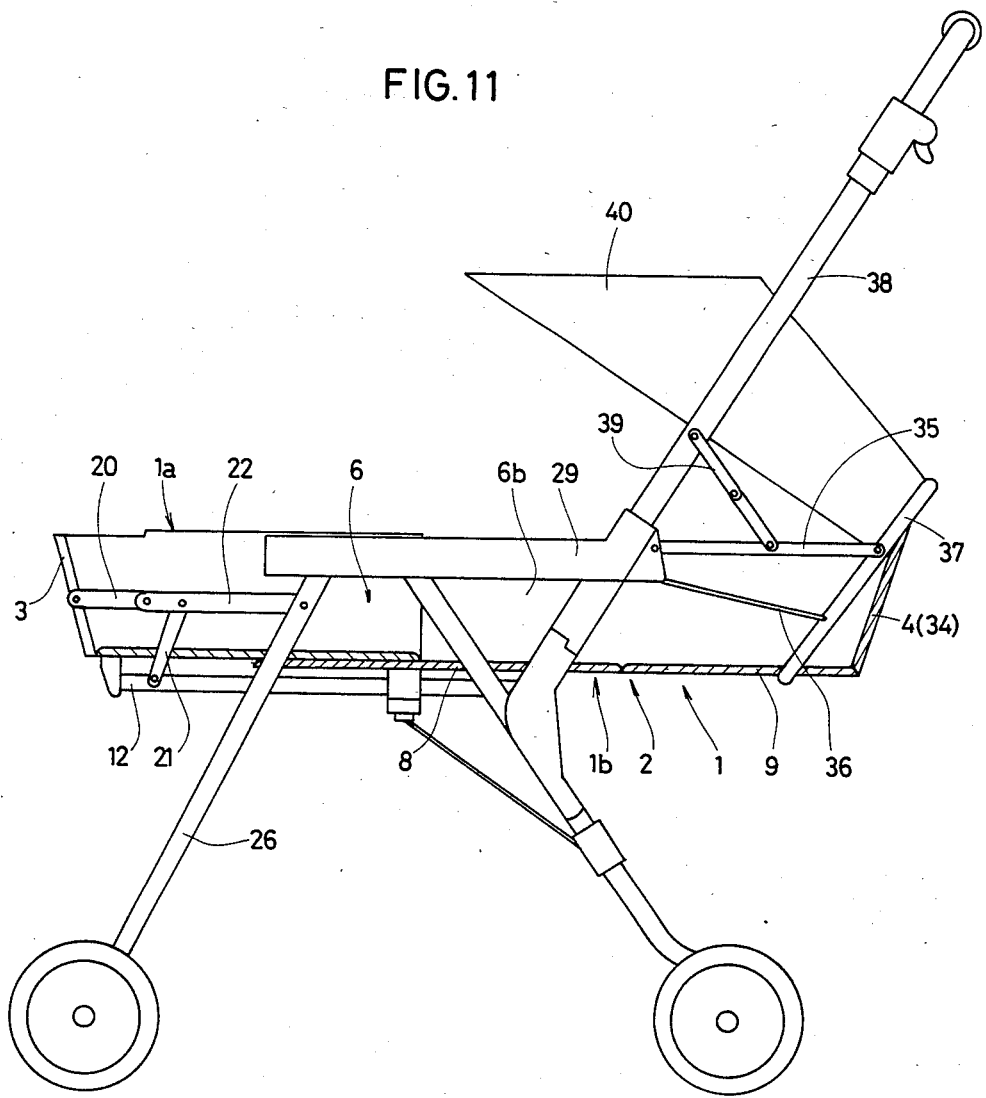
FIG. 11 is a side view of a baby carriage having another embodiment of the invention attached thereto, the view, as compared with FIG. 1, showing an additional arrangement forming a backrest.
Figure 12:
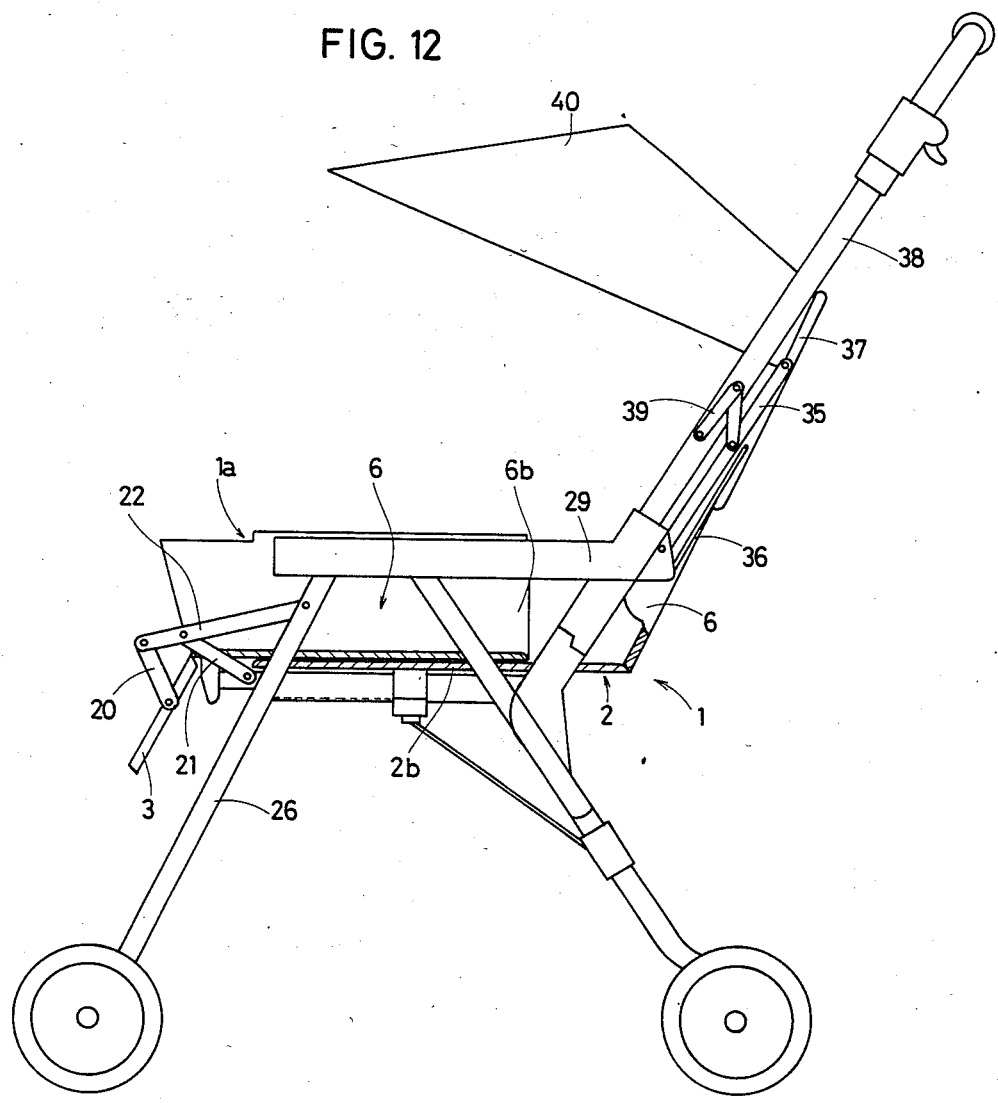
FIG. 12 shows the bed assuming the chair form of the baby carriage of FIG. 11.

FIGS. 11 and 12 show another example of an arrangement for forming the backrest. To apply the arrangement shown therein, it is preferable that a back surface core 34 be incorporated as a hard core in the back wall 4. A main lever 35 is turnably supported at the rear end of a handrail which is a part of the baby carriage main body. Below the main lever 35, an auxiliary lever 35 is turnably supported at the rear end of the handrail 29. A bed rear portion support member 37 is held by the main and auxiliary levers 35 and 36 and directly supports the rear end of the rear portion 1b of the bed 1. A reclining adjusting link 39 is connected between the main lever 35 and the push rod 38 of the baby carriage, and the extent of collapse of the reclining adjusting link 39 determines the degree of inclination of the main lever 35. When the main lever 35 is horizontal as shown in FIG. 11, the bottom wall 2 in the rear end portion of the bed 1 supported by the bed rear portion support member 37 is maintained in a horizontal position, providing the original bed form. As shown in FIG. 12, when the main lever 35 is raised, the bed rear portion support member 37 is upwardly displaced, raising the back wall 4 and also the portion of the bottom wall 2 having the rear backward half core 9 incorporated therein. As a result, the portion with the rear backward half core 9 cooperates with the back wall 4 to form the backrest. The auxiliary lever 36 is used to control the attitude of the bed rear portion support member 37. For example, in the case of the FIG. 12 state, it controls the bed rear portion support member 37 so that the latter contacts the back surface of the bottom wall 2 and the back wall 4 and the portion with the rear backward half core 9 align with each other.

A hood 40 may be installed by utilizing the bed rear portion support member 37.

While the invention has been described with reference to specific embodiments, some modifications are possible. For example, while the collapsible rod means for connecting the front wall 3 to the baby carriage main body has been described as comprising the front, rear and central link rods 20, 22, and 21 in the illustrated embodiments, only the front and rear link rods 20 and 22 may be used. Further, as to the point of connection between the rear link rod 22 and the baby carriage main body, the front leg has been selected in the embodiments, but this point of connection may be located on the handrail 29 or on some other parts of the baby carriage main body.

In the above description, no reference has been made to the collapsing operation of the baby carriage, but a bed which satisfactorily follows the collapse movement of the baby carriage may be obtained by giving due consideration to the materials constituting the bed or the manner of connection between the materials, such bed being applicable to a collapsible baby carriage and also to a baby carriage not having any collapsing function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage bed, comprising a bottom wall (2), a front wall (3), a back wall (4), a left-hand side wall (5), and a right-hand side wall (6) forming a box having a front box section and a rear box section, said front box section including interconnected front portions (2a, 5a, 6a) of said bottom wall (2), of said left-hand side wall (5), and of said right-hand side wall (6), said rear box section including respective also interconnected rear portions (2b, 5b, 6b), said front portions (2a, 5a, 6a) being separate from said rear portions and disposed in staggered relation to said rear portions (2b, 5b, 6b), said front wall (3) being separable from said left-hand side wall and from said right-hand side wall and turnable around a hinge line (11) between said front wall and said bottom wall (2), a pair of longitudinally slidable draw rods (12) one of which is installed on each side below said bottom wall (2), said front portions (2a, 5a, 6a) being attached to said draw rods (12) so that when the latter are pushed rearwardly, the front portions (2a, 5a, 6a) slide into an overlap position relative to said rear portions (2b, 5b, 6b), collapsible rod means for connecting said front wall (3) to a baby carriage main body, said collapsible rod means comprising a front link rod (20), a central link rod (21), and a rear link rod (22), said front link rod (20) being turnably connected at its front end to said front wall (3) and at its rear end to a front end of said rear link rod (22), said rear link rod (22) being turnably connected at its rear end to a baby carriage main body, and said central link rod (21) being turnably connected at its upper end to said rear link rod (22) and at its lower end to the associated draw rod (12), whereby said front wall (3) closes a front of said baby carriage bed when the draw rods (12) are in their foremost drawn-out position, and whereby said front wall (3) is moved downwardly to open the front of the baby carriage bed when said draw rods are pushed rearwardly for converting said bed into a chair.

* * * * *